Jan. 30, 1968 G. HERR ET AL 3,366,026
LINING UPHOLSTERY FOR A VEHICLE
Filed May 26, 1965 2 Sheets-Sheet 1
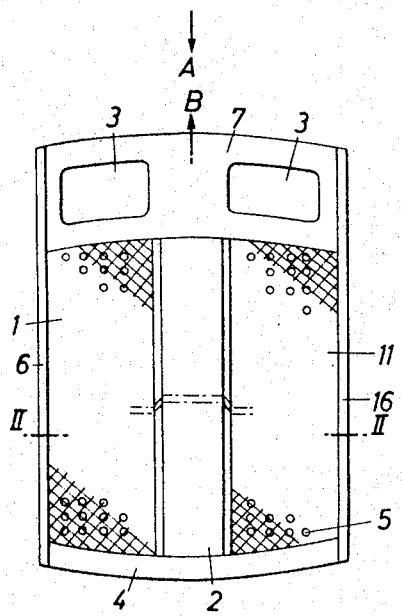
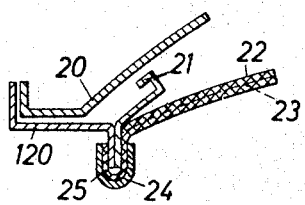
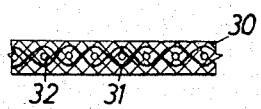
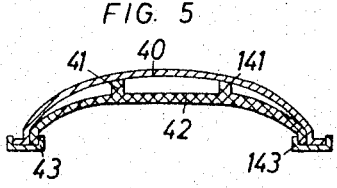
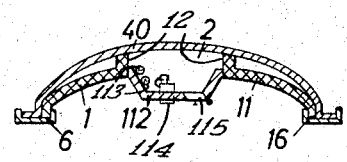
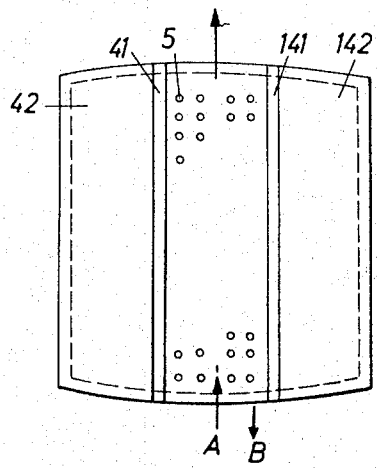
INVENTORS
GERHARD HERR
KURT CZIPTSCHIRSCH
WILLI O. TREIBER
BY Dicke + Craig
ATTORNEYS

# United States Patent Office 3,366,026
Patented Jan. 30, 1968

3,366,026
LINING UPHOLSTERY FOR A VEHICLE
Gerhard Herr, Wuppertal-Vohwinkel, Kurt Cziptschirsch, Wuppertal-Barmen, and Willi O. Treber, Wuppertal-Elberfeld, Germany, assignors to Gebr. Happich G.m.b.H., Wuppertal - Elberfeld, Germany, a firm
Filed May 26, 1965, Ser. No. 459,048
Claims priority, application Germany, May 29, 1964,
H 52,816
24 Claims. (Cl. 98—2)

This invention relates to lining upholstery, particularly for a side wall or roof of a vehicle. It is an object of the invention to provide upholstery which serves at the same time for ventilation. Composite upholstery structures are known. It is also known to provide ventilation openings, e.g., in the front and rear walls of a vehicle. The known ventilating means have the disadvantage, however, of creating an excessive draft.

This invention relates to a lining upholstery of foamed plastics material or another resilient upholstery material covered with plastics material sheeting, artificial leather, leather or textile fabric, and is mainly characterized in that this upholstery is provided with spacers, such as ribs and/or bosses, which may be made from the same material as the body of the upholstery and foamed integrally with it or may be attached thereto, and these spacers are disposed between the body of the upholstery and the roof or side wall to be lined so that air ducts are formed, the upholstery being formed with air passages, e.g., with air permeable pores.

Embodiments or roof linings according to the invention are shown by way of example on the drawings, in which:

FIG. 1 shows roof upholstery consisting of two half-shell members.

FIG. 2 is a transverse sectional view taken on plane II—II of FIG. 1.

FIG. 3 shows a means for fixing roof upholstery to the edge of the vehicle roof.

FIG. 4 is a transverse sectional view showing an upholstery pad.

FIG. 5 is a transverse sectional view showing a top provided with a second embodiment of upholstery according to the invention.

FIG. 6 shows the upholstery of FIG. 5 from the side which faces the roof, which has been omitted.

Figure 7:
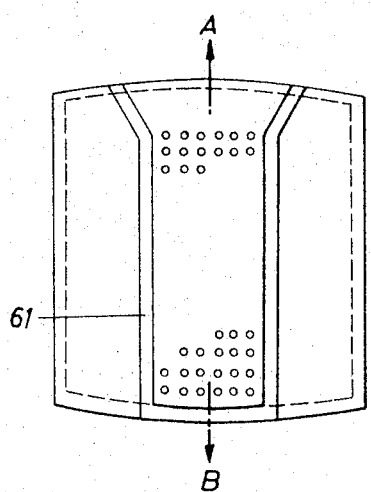

FIGS. 7, 8, 9, and 10 show further modifications of a roof upholstery.

As is apparent from the drawings, roof upholstery consisting, e.g., of foamed plastics 42 or another resilient upholstery material, which has shock absorbing properties, is preferably provided with a covering of plastic sheeting, artificial leather, leather and/or textile fabric. This covering may be partly perforated so that the air contained in the upholstery material and of the cavity between the upholstery and the roof covering 40 can be utilized for shock absorption. The foamed upholstery material is provided with integrally foamed ribs 41, 141 (FIG. 5), 61 (FIG 7), 70, 71 (FIG. 8) or 91 (FIG. 10) or bosses, which either consist of the same material and are integrally foamed with the upholstery or are attached to it so that cavities are formed between the roof covering 40 and the foamed plastics 42 (FIG. 5). According to the invention, these cavities serve as air ducts for supplying air to and removing air from the interior of the vehicle. The ribs form preferably the boundary walls of the air ducts. The ribs and/or bosses are preferably used also for suspending the lining from the roof covering. They may be utilized to dampen the rumble of the sheet metal roof covering, particularly in conjunction with the body of the upholstery.

The upholstery may be inherently stable and self-supporting without a reinforcing insert or may have a support or reinforcing insert, which may be embedded, loosely inserted, adhered to one side of the upholstery or adhesively bonded in the upholstery. The reinforcing insert consists preferably of a wire mesh 23, e.g., of a woven wire fabric having a warp 32 and filling 31 (FIG. 4).

The upholstery plates consist of one or more materials, which can be deformed by simple means. For instance, the reinforcing insert consisting of a wire netting, e.g., of woven wire fabric or wire mesh, may be covered on each side by a plate of resilient plastics material, which is provided with adhesive on the side facing the wire mesh. The adhesive-coated faces of the foamed plastic plates are put together, with the wire netting interposed, so that the latter is enclosed between the plates.

Alternatively, the wire netting may be inserted into a mold and a foamable liquid, such as rubber latex or synthetic latex, provided with an expanding agent, may be filled into the mold cavity and foamed therein so that the wire netting is eventually embedded in the foamed plastic panel 30 or 22, which has been molded around the netting.

The upholstery may be snapped into undercut recesses 43, 143 (FIG. 5) or behind tongues provided on the edge of the roof. The sheet metal tongues are preferably struck in the form of hooks from the sheet metal lining provided at the walls or the door near the edge of the roof. In order to avoid a squeaking due to the friction between the relatively movable parts in the areas of contact, layers of leather or rubber are interposed in these areas.

As is shown in FIG. 3, the roof upholstery may be clamped at its edge with the aid of an edge protecting sectional member 24 to a freely protruding sheet metal part, e.g., the sheet metal flange 25 of the inner edge stiffening member 21. In this case, the edge protecting sectional member 24 serves also for covering the sharp edges of the sheet metal elements 120 and 21 and, if desired, the free wire ends of the wire netting and/or any sheet metal edge bordering of the wire netting. The sheet metal bordering may consist of a channel section and is particularly suitable if the upholstery contains a wire netting which extends as far as to the edge of the upholstery, particularly if the upholstery is arcuate. In this case the edge bordering prevents a separation of the edge wires of the woven wire fabric from the body of the fabric.

That face of the upholstery which faces the interior of the vehicle in assembled condition is provided with a covering, which consists of a covering material provided with air passages, particularly small air passages. This covering material may consist of a textile fabric, artificial leather or preferably of plastics material sheeting having fine perforations or artificial leather having fine perforations. If small perforations are used, the lining according to the invention may be utilized for a shock absorbing air throttling action in addition to the ventilating action.

The top face of the upholstery plate, facing the sheet metal roof covering 40 (FIG. 5) remains generally uncovered.

Upholstery which may be used, e.g., as roof upholstery may consist of a plurality of shell members. In FIGS. 1 and 2, for instance, a roof upholstery consists of two half-shell members 1, 11, which leave an air duct 2 between their edges 12 facing the center of the roof.

The air duct 2 is preferably downwardly recessed beyond the upholstery plate in order to increase the cross-section of this duct. The latter may be provided internally, or on or in its bottom covering 112, with cables 113 or lighting fixtures 114. The bottom of this duct is formed by a preferably upholstered channel-shaped member 112, which serves also to hold the two half-shell members 1, 11 of the roof upholstery in position. A portion of the channel-shaped member 112 may be hinged to provide a door 115 opening to the duct 2, thereby providing a compartment for receiving various items.

As is indicated in FIG. 2, the half-shell members 1, 11 and the channel-shaped member 112 may be designed to support each other because the half-shell members bear on the lips 6, 16 and the roof covering 40.

Even in relatively low vehicles, the central duct 2 with its downwardly protruding trough member 112 is not disturbing because a drive shaft housing extends usually along the longitudinal center line of the vehicle bottom and the seats are disposed on both sides of this housing. The side edges 6, 16 are secured, e.g., with the edge mounting means 24, 25 shown in a transverse sectional view in FIG. 3. The half-shell members 1, 11 and channel-shaped member 112 are suitably supported by a cross-strut 4 at the rear transverse edge, and by the upholstery shell member 7 at the front transverse edge. As is indicated in FIG. 1, the upholstery shell member 7 may be formed with recesses for receiving the hinged sun virsors when the same are out of use. In this example, the space between the upholstery shell member 7 and the roof 40 constitutes also an air duct. To take in fresh air, this space communicates with air inlet openings. Suitable air passages are provided for the flow of air into the duct 2 and from the latter into the compartments behind the half-shell members 1 and 11. Fresh air flows through perforations 5 from the cavities into the interior of the vehicle body. The arrangement may be modified so that spent air is sucked from the interior of the vehicle body through the perforations and the cavities.

FIG. 6 shows a simple roof upholstery without recesses for sun visors. In this upholtsery, the air ducts 42, 142 are provided on both sides and the air passages 5 at the center. The ventilating system may be arranged for supplying or exhausting air, the air being blown in at the front end by the slip stream or being sucked off at the rear.

FIG. 7 shows a modified roof upholstery similar to that of FIG. 6. In this case, the ribs 61 diverge at one end of the upholstery. This results in the formation of a flaring duct, which increases the dynamic pressure in the case of an air supply and the suction effect in the case of an air exhaust.

Figure 8:
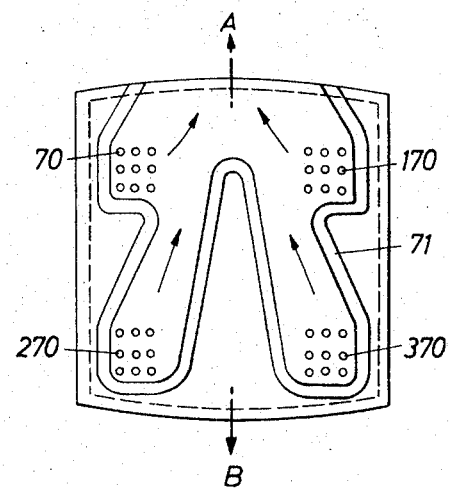

In the embodiment shown in FIG. 8, the rib is arranged so that the air is sucked off from or blown into the interior of the vehicle body at four separate points 70, 170, 270, 370, which correspond to the positions of four occupants of the vehicle.

Figure 9:
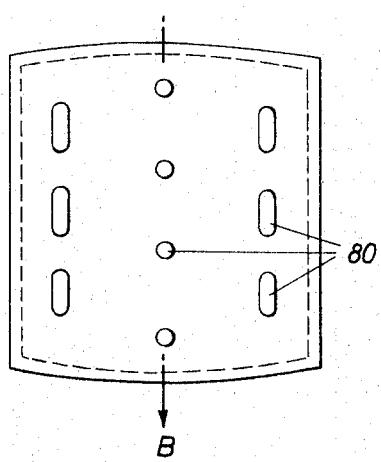

In the embodiments shown in FIGS. 5, 6 and 7, an air supply to or exhaust from the interior of the vehicle body is effected only at the center. In the embodiment of FIG. 9, the air is supplied or exhausted throughout the roof area. For this purpose, the perforations not shown in this figure, are distributed substantially throughout the area of the upholstery.

Figure 10:
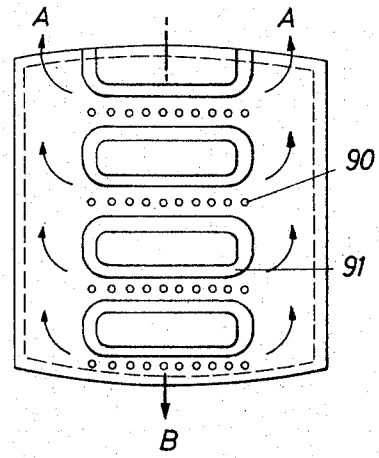

Another example is shown in FIG. 10, where the ventilation is mainly effected at the center. In this case, air enters or is exhausted in spaced apart areas of the central portion of the roof and is supplied or discharged on the sides between the upholstery and the roof.

Air ducts provided in the vehicle body serve for supplying fresh air to or for discharging spent air from the space below the roof covering.

The upholstery according to the invention enables a highly uniform, finely distributed supply or exhaust of air, without creation of draft.

What is claimed is:

1. A vehicle wall structure, which comprises a wall member, resilient, air-permeable upholstery, consisting mainly of foamed plastic material, connected to the inside surface of said wall member, and spacer means disposed between said upholstery and wall member and holding said upholstery spaced from said wall member at least in part of the area of said upholstery, said upholstery and wall member defining between them a passage for the flow of air between said upholstery and wall member.

2. A vehicle wall structure as set forth in claim 1, in which said upholstery has on the side opposite to said wall an air-permeable sheet member covering.

3. A vehicle wall structure as set forth in claim 1, in which said spacer means are integrally formed with said upholstery.

4. A vehicle wall structure as set forth in claim 1, in which said spacer means comprise ribs carried by said upholstery.

5. A vehicle wall structure as set forth in claim 1, in which said spacer means comprise bosses carried by said upholstery.

6. A vehicle wall structure as set forth in claim 1, in which said wall member forms a vehicle roof.

7. A vehicle wall structure as set forth in claim 1, in which said wall member forms a side wall for a vehicle.

8. A vehicle wall structure as set forth in claim 1, in which said upholstery has pores for air permeability.

9. A vehicle wall structure as set forth in claim 1, in which said upholstery is provided with a reinforcement, said reinforcement being embedded in said upholstery.

10. A vehicle wall structure as set forth in claim 1, in which said upholstery comprises two layers adhesively joined and a reinforcement is interposed between said two layers.

11. A vehicle wall structure as set forth in claim 10, in which said reinforcement comprises a wire mesh.

12. A vehicle wall structure as set forth in claim 1, in which said upholstery is provided with a reinforcement, said reinforcement being adhered to said upholstery.

13. A vehicle wall structure as set forth in claim 1, in which said wall member is a vehicle roof and said upholstery comprises two half-shell members having spaced apart inner edges, and a channel-shaped member, which, in combination with said two half-shell members and said vehicle roof, defines an air passage.

14. A vehicle wall structure as set forth in claim 13, in which said channel-shaped member is upholstered on the underside.

15. A vehicle wall structure as set forth in claim 13, in which said channel-shaped member includes cables.

16. A vehicle wall structure as set forth in claim 13, which comprises lighting fixtures mounted in said channel-shaped member.

17. A vehicle wall structure as set forth in claim 13, in which said channel-shaped member is formed to provide access to said air passage.

18. A vehicle wall structure as set forth in claim 1, in which said upholstery is perforated only in part of its area.

19. A vehicle wall structure as set forth in claim 18, in which said upholstery has a perforated central portion.

20. A vehicle wall structure as set forth in claim 18, in which said upholstery has perforated side portions and a non-perforated central portion.

21. A vehicle wall structure as set forth in claim 1, in which said spacer means comprise two rectangular ribs dividing said upholstery into a central portion and two side portions, said central portion is formed with perforations and said side portions define air passages with said wall member.

22. A vehicle wall structure as set forth in claim 1 in which said wall member comprises a stiffening member and said upholstery is attached to said stiffening member by an edge-protecting clamping member.

23. A vehicle wall structure, which comprises a wall member resilient, air-permeable upholstery connected to the inside surface of said wall member, and spacer means disposed between said upholstery and wall member and holding said upholstery spaced from said wall member at least in part of the area of said upholstery, said upholstery and wall member defining between them a passage for the flow of air between said upholstery and wall member, further comprising an inner edge stiffening sheet metal member having a freely protruding sheet metal flange, an edge-protecting sectional member clamping said upholstery against said sheet metal flange, and a wire reinforcement for said upholstery, said reinforcement having free wire ends, said edge-protecting sectional member covering said free wire ends.

24. In combination with a vehicle wall, upholstery consisting substantially of resilient, air-permeable material and incorporating a flexible mesh reinforcement, said upholstery being provided with integral spacer means on one side thereof, said spacer means contacting said vehicle wall, thus defining an air passage between said one side of said upholstery and said vehicle wall, the opposite side of said upholstery being covered with an air-permeable sheet fabric having relatively small perforations therein.

References Cited
UNITED STATES PATENTS

| | | | |
|---|---|---|---|
| 2,013,601 | 9/1935 | Clark | 98—2 |
| 2,087,651 | 7/1937 | Mygland | 98—2.7 |
| 2,171,622 | 9/1939 | Calkins | 98—2 |
| 2,768,026 | 10/1956 | Stephens | 98—2 |
| 2,858,572 | 11/1958 | Burdick | 264—45 |

MEYER PERLIN, *Primary Examiner.*